No. 747,635. PATENTED DEC. 22, 1903.
T. H. PITZER.
TENDER FOR TRACTION ENGINES.
APPLICATION FILED JULY 3, 1903.
NO MODEL. 2 SHEETS—SHEET 2.
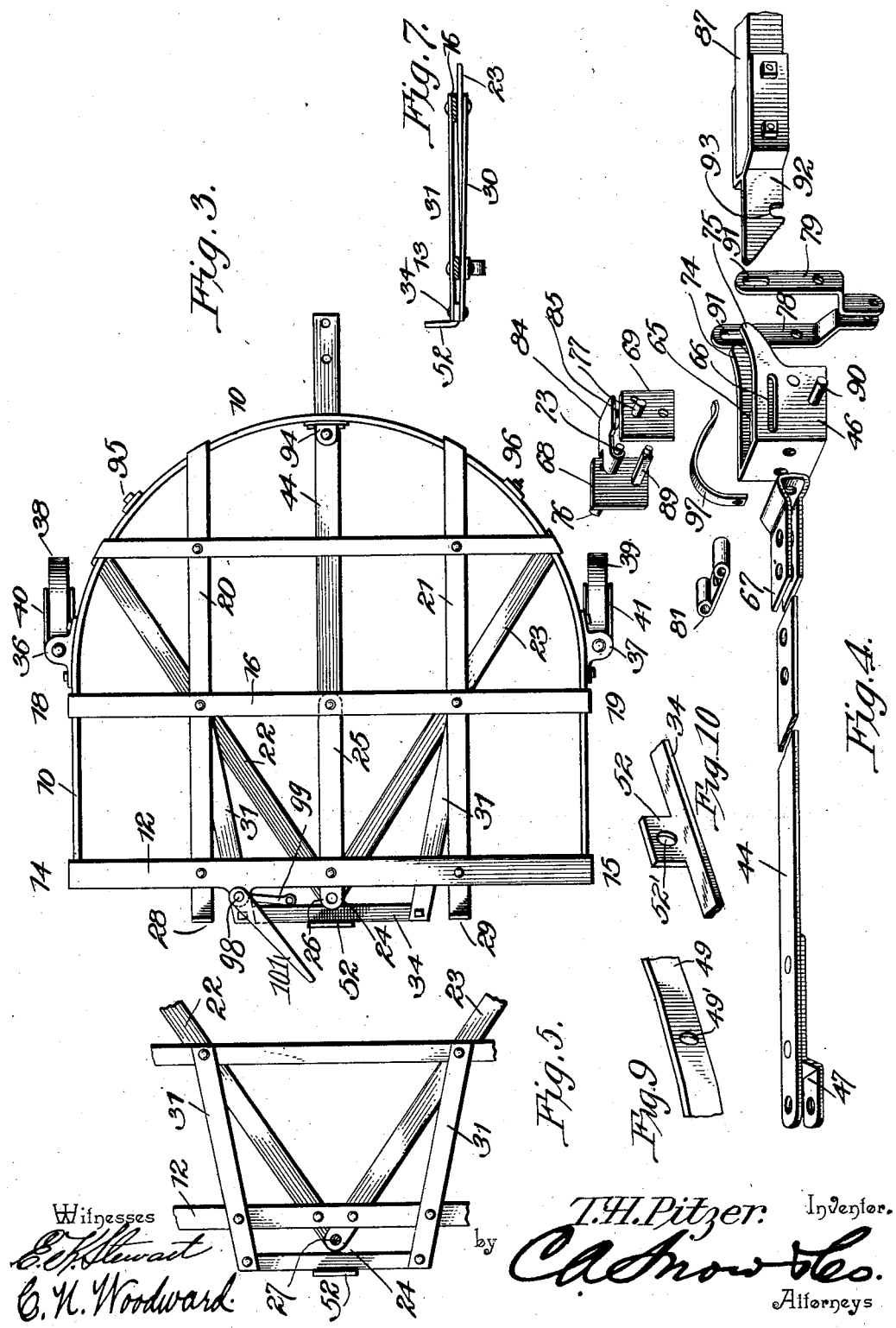
Witnesses
E. K. Stewart
C. N. Woodward
T. H. Pitzer, Inventor.
by C. A. Snow & Co.
Attorneys No. 747,635.

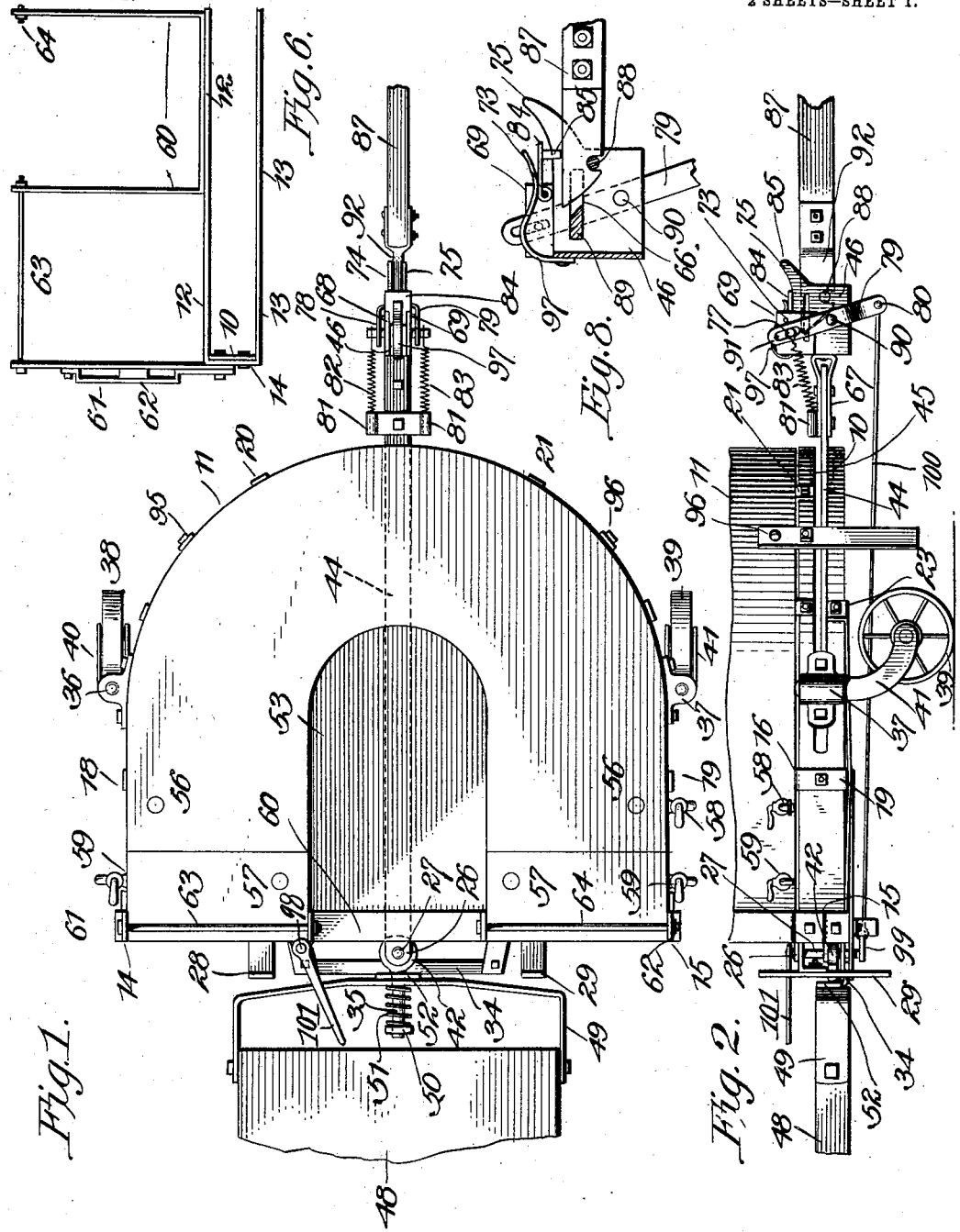

Patented December 22, 1903.

UNITED STATES PATENT OFFICE.

THOMAS H. PITZER, OF GAYLORD, KANSAS.

TENDER FOR TRACTION-ENGINES.

SPECIFICATION forming part of Letters Patent No. 747,635, dated December 22, 1903.

Application filed July 3, 1903. Serial No. 164,239. (No model.)

*To all whom it may concern:*

Be it known that I, THOMAS H. PITZER, a citizen of the United States, residing at Gaylord, in the county of Smith and State of Kansas, have invented a new and useful Tender for Traction-Engines, of which the following is a specification.

This invention relates to the tenders for traction-engines and the like, and has for its object to simplify and improve the apparatus, more particularly the supporting-frame therefor, whereby the tender-support will "track" with the engine and the thresher or other machinery being transported will track with the tender and both disposed in position to be backed when required.

The invention consists in certain novel features of construction, as hereinafter shown and described, and specified in the claims.

In the drawings illustrative of the invention, in which corresponding parts are denoted by like designating parts, Figure 1 is a plan view of the apparatus complete. Fig. 2 is a side elevation of the lower portion of the apparatus. Fig. 3 is a plan view of the framework with the tank and coupling member detached. Fig. 4 represents the parts comprising the coupling means between the tender-frame and thresher or other apparatus to be transported disconnected and in perspective. Fig. 5 represents a plan view of a portion of the framework. Fig. 6 is a rear elevation, on a reduced scale, of the rear coupling means between the tank and frame. Fig. 7 is a sectional detail of a portion of the framework. Fig. 8 is a detail of the coupling mechanism. Figs. 9 and 10 are details of the coupling-plates, showing the draw-bar apertures therein.

The improved device comprises generally a supporting-frame mounted upon bearing-wheels, a receptacle for the fuel, water, oil, and similar supplies, and coupling means between the frame and traction-engine and between the frame and the thresher or other machinery to be transported. The receptacle member will rest upon the frame entirely independent of the latter, so that no strains to which the frame will be subjected will be communicated to the receptacle and so that the receptacle may be detached from the frame when required. The frame and receptacle will preferably be entirely of metal, and the frame consists of a plate-like portion 10, preferably in U shape and conforming to the rear portion of the receptacle represented at 11 and with a band-like frame formed with parallel sides 12 13 and connected by its ends to the forward free ends of the member 10 at 14 15, as shown. One or more intermediate band-like frames 16 will also be employed, each formed with parallel sides and connected by the ends to the member 10, as shown at 18 19. The frame will be strengthened by upper longitudinal braces 20 21 and lower, preferably diagonal, braces 22 23, the latter converging toward the forward end and overlapping in advance of the frame member 13, as at 24, and provided with registering apertures in their overlapping portions.

Connecting the frame members 12 16 is a central brace member 25, extending in advance of the frame, as at 26, and provided with an aperture in vertical alinement with the apertures in the overlapping portions at 24, the alined apertures adapted to support coupling-pin 27, when required, as hereinafter shown.

The brace members 20 21 are extended forwardly of the frame member 12 and terminate in "buffers" 28 29, as shown.

Attached beneath the frame are spaced brace-plates 30, and above these lower plates like upper plates 31 are placed, the plates 30 31 connected, as by bolts or rivets, at the crossing-points of the brace members 22 23 and frame member 13 16. The members 30 31 pass forwardly upon opposite sides of the frame member 13 and are riveted or bolted thereto and are connected by bolts or rivets forwardly of the frame by a transverse draft-plate 34, the latter having an upwardly-turned forward side 52, provided with an aperture 52' for the draw-bar 35, as hereinafter explained.

Attached to the frame member 10 at opposite sides and preferably slightly forward of the center of gravity of the device are sockets 36 37 for bearing-wheels 38 39, preferably supported in swinging frames 40 41, maintaining the wheels off from the center of the sockets, as shown, so that they will "trail" behind their centers to assist in turning on curves. The bearing-wheels will preferably be provided with ball-bearings to reduce the friction.

The draw-bar member 35 is provided with an eye 42 at its rear end, and coupled to this eye by the pin 27 is a coupling-bar 44, extending rearwardly through an aperture 45 in the plate member 10 and terminating a coupling-head, as shown. The forward end of the bar 44 is forked, as at 47, and embraces opposite sides of the eye 42 of the draw-bar, the pin 27 passing through the three parts, as shown.

The engine-frame is indicated at 48 and may be of any desired form, and in the engine selected for illustration a rearwardly-curving coupling-plate 49 is employed through an aperture 49', in which the draw-bar 35 passes, as shown, the aperture being large enough to permit the draw-bar to have considerable lateral play. The member 49 or its equivalent varies in size and form in engines of different form and construction, and the members 35 and 34 will be the only parts therefore of the device which will require modification to adapt it to the various engines in common use. The draw-bar 35 is threaded at the forward end and will be provided with a clamp-nut 50, and between the nut and the plate 49 a relatively powerful spring 51 is placed, as shown. By this simple means it will be obvious that when the engine is moved forward the tender-frame and its receptacle will trail after it, and all the strains will be borne by the spring-supported draw-bar, and by means of the relatively large apertures in the member 49 52 the tender-frame will have the necessary flexibility of movement relative to the engine-frame to insure the proper "trailing" of the former when turning or running upon curves. When backing, the member 49 will be engaged by the buffer members 28 29, as the case may be, and thus transmit the backing strains to the whole body of the frame and prevent damage thereto.

If preferred, the members 34 52 may be detached and the coupling-pin 27 alone depended upon to draw the tender and its attachments.

The receptacle 11 is formed with a central receiver 53 for coal or other bulky fuel, while the remainder will be divided into compartments for oil, water, and other supplies, as represented, the compartments having supply receptacles or openings 56 and 57 and draw-off or discharge valves 58 59 of suitable form. The receiver member will be detachably connected to the supporting-frame by a bracket 60 within the receptacle 53 and connected by tie-rods 63 64 to standards 61 62, attached to the forward ends of the member 10 and also supported by clips 95 96 from the member 10.

The coupling-head upon the rear end of the bar 44 consists of a U-shaped member 46, with parallel sides and having oppositely-disposed longitudinal apertures 65 66 forming guideways, as shown, the member 46 also having upwardly and rearwardly inclined portions 74 75 and supported by a stay-bolt 88, as shown. The bar or beam 44 is provided with a clamp-head 67, bolted or riveted thereto and to which the member 46 is secured by bolts or rivets, as shown.

Slidably disposed through the guideways 65 66 is a cross-head 89, having threaded ends and supporting plates 68 69 by nuts on the cross-head outside the member 46, the upper portions of the plates being connected above the member 46 by a bolt 73, as shown. The plates 68 69 are provided with oppositely-extending trunnions 76 77, as shown.

Passing through the member 46 is a stud-bolt 90, upon whose ends spaced levers 78 79 are journaled intermediately, as shown, and having elongated apertures 91 in their upper ends engaging the trunnions 76 77, as shown, and converging at their lower ends and connected by a bolt 80 beneath the member 46.

Attached to the member 67 is a clip 81, to which springs 82 83 are attached and leading to the trunnions 76 77 and exerting their force to maintain the plates 68 69 and their attachments yieldably in their operative or withdrawn position.

Pivotally connected to the bolt 73 is a plate 84, having a stop member 85 depending therefrom, the plate supported yieldably by a spring 97 upon the member 46 and the stop member extending between its side walls and spaced from the stay-bolt 88, as shown.

A portion of a threshing-machine draft-tongue is represented at 87, having a coupling member 92, connected at its free end, the coupling member having a recess 93, adapted to engage the stay-bolt 88 when the member 92 is inserted between the sides of the member 46 and beneath the stop 85, as shown in Fig. 8, the spring 97 exerting its force to maintain the member 87 in yieldable engagement with the stay-rod 88. The extremity of the member 92 is inclined, as shown, so that the bar 89 when carried rearwardly by the movement of the arms 78 79 upon the trunnions 76 77 will pass beneath the incline and elevate the member 87 and release it and at the same time causing the member 84 to travel up the inclined ends 74 75 and relieve the member 87 from the pressure of the spring 97.

Mounted for rotation on the forward part of the framework is a shaft 98, having a crank-arm 99 on its lower end connected by a draft-wire 100 to the cross-rod 80 of the arms 78 79, so that the rotation of the shaft 98 will actuate the coupling mechanism and release the member 87, as above noted. The shaft 98 is provided with a lever 101, extending to a point convenient to the foot of the operator, or, if preferred, the shaft may be extended upward, so that the operating-lever may be convenient to the hand of the operator. By this simple means the member 87 92 may be automatically coupled to the tender-supporting frame and uncoupled by the engineer by merely manipulating the shaft 98 by the foot or hand.

The draft-beam 44 is free to swing laterally in the aperture 45, so that the thresher or other apparatus which is to be transported will trail properly after the tender and engine when turning or following curves.

The frame member 10 is provided with stop-plates 94, connected centrally thereto upon opposite sides of the aperture 45 and having alined apertures, while the beam 44 is provided with a corresponding aperture, so that when it is desired to lock the beam 44 immovably to the tender-frame, which may be required under some circumstances, it may be done by inserting a pin through the apertures in the member 94 and 44. By this means a very strong and relatively light supporting-frame for the tender is produced which is entirely independent of the receptacle for the supplies and which may be readily adapted to any size or form of engines or to the apparatus to be operated thereby.

The parts of the frame will preferably be of steel as light as possible consistent with the strains to which they will be subjected and may be modified in minor particulars without departing from the principle of the invention or sacrificing any of its advantages.

Having thus described the invention, what I claim is—

1. In an apparatus of the class described, an engine-frame having a rearwardly-curving coupling-plate provided with a transverse aperture, a tender-frame having a corresponding coupling-plate provided with a central transverse aperture, and a draw-bar extending through said apertures and carrying a spring between its forward end and the coupling-plate on said engine, to yieldably hold said plates in close relation.

2. In an apparatus of the class described, an engine-frame having a rearwardly-curving coupling-plate provided with a transverse aperture, a tender-frame having a corresponding coupling-plate provided with a central transverse aperture, a draw-bar engaging said apertures and carrying a spring between its forward end and the coupling-plate on said engine-frame, and with an eye in its rearward end, a coupling-beam movably connected to said eye and extending rearwardly of the tender-frame, and adapted to be movably coupled to the thresher or other apparatus to be transported, substantially as described.

3. In an apparatus of the class described, an engine-frame having a rearwardly-curving coupling-plate provided with a transverse aperture, a draw-bar engaging said apertures and carrying a spring between its forward end and the coupling-plate on said engine and with an eye in its rear end, a tender-frame provided with spaced coupling-plates having apertures adapted to register with the eye in said draw-bar, and a coupling-pin engaging said registering apertures, substantially as described.

4. In an apparatus of the class described, an engine-frame having a rearwardly-curving coupling-plate provided with a transverse aperture, a draw-bar engaging said apertures and carrying a spring between its forward end and the coupling-plate on said engine and with an eye in its rear end, a tender-frame provided with spaced coupling-plates having apertures adapted to register with the eye in said draw-bar, coupling-pin engaging said registering apertures, and a coupling-beam movably engaging said coupling-pin at one end and extending rearwardly of the tender-frame and adapted to be movably connected to the thresher or other apparatus to be transported, substantially as described.

5. In an apparatus of the class described, an engine-frame having a rearwardly-curving coupling-plate provided with a transverse aperture, a draw-bar engaging said apertures and carrying a spring between its forward end and the coupling-plate on said engine and with an eye in its rear end, a tender-frame provided with spaced coupling-plates having apertures adapted to register with the eye in said draw-bar, a coupling-beam having a forked end provided with alined apertures and embracing the eye end of said draw-bar, and extending rearwardly of the tender-frame, and a coupling-pin engaging said registering apertures, substantially as described.

6. In an apparatus of the class described, an engine-frame carrying a draw-bar spring-supported and terminating in an eye rearwardly of the frame, a tender-frame provided with spaced coupling members having apertures and adapted to be positioned in alinement at opposite sides of the eye in said draw-bar, a coupling-beam having an aperture and adapted to be positioned with its aperture registering with said eye and alined tender-apertures and extending rearwardly of the tender-frame and adapted for attachment to a thresher or other apparatus to be transported, and a coupling-pin engaging said alined apertures, substantially as described.

7. In an apparatus of the class described, a tender-frame comprising an external plate conforming to a portion of the reservoir member and connected by a band-like frame conforming to the remainder of the frame and with parallel sides and connected at the ends to the plate portion, and one or more intermediate band-like frames connected by their ends to the plate portion, and longitudinal brace members connecting said band-frames, and plate member, substantially as described.

8. In an apparatus of the class described, a tender-frame comprising an external plate conforming to a portion of the reservoir member and connected by a band-like frame conforming to the remainder of the frame and with parallel sides and connected at the ends to the plate portion, and one or more intermediate band-like frames connected by their ends to the plate portion, and longitudinal brace members connecting said band-frames and plate member, two of said brace members converging at the front and overlapping beneath the frame and provided with registering apertures, and one of said brace members extended forwardly above the frame and provided with an aperture in vertical alinement with the aperture in said lower brace members, said apertures adapted to receive a coupling-pin whereby the frame is adapted for connection to the transporting power, substantially as described.

9. In an apparatus of the class described, a tender-frame comprising an external plate conforming to the rear portion of the reservoir member and provided with a lateral aperture, a band-like frame conforming to the forward portion of the reservoir member, brace members connecting said forward frame and plate above and below the frame and provided with vertically-alined apertures, a coupling-pin engaging said alined apertures and affording means for connection to the draft-power, a coupling-beam movably connected to said pin and extending rearwardly through said lateral aperture, and adapted for connection to a thresher, or other apparatus to be transported and bearing-wheels supporting said frame and its attachments, substantially as described.

10. In an apparatus of the class described, a tender-frame, having bearing-wheels, means for coupling said frame movably to the draft-power, a coupling-beam connected to said frame adjacent to its forward side and extending rearwardly thereof, and terminating in a coupling-head, a coupling-jaw movably supported in said head, and draft member carried by the thresher or other apparatus to be transported and adapted to be detachably connected to said coupling-jaw, substantially as described.

11. In an apparatus of the class described, a tender-frame having bearing-wheels, means for coupling said frame movably to the draft-power, a coupling-beam connected to said frame adjacent to its forward side and extending rearwardly thereof, and terminating in a coupling-head, having a transverse stay-bar, a draft member carried by the thresher or other machine to be transported, and having a recess adapted to engage said stay-bar, a trip means carried by said coupling-head and adapted to release said draft member, and means operative from the forward end of said frame for operating said tripping means, substantially as described.

12. In an apparatus of the class described, a tender-frame having bearing-wheels, means for coupling said frame movably to the draft-power, a coupling-beam connected to said frame adjacent to its forward side and extending rearwardly thereof, and terminating in a coupling-head, having an upwardly and rearwardly inclined portion and a transverse stay-bar spaced from said inclined portion, a draft member carried by the thresher or other apparatus to be transported and having a recess adapted to engage said stay-bar, a swinging stop-bar mounted for movement over said inclined portion and maintained in yieldable engagement with said draft member, a trip means carried by said coupling-head and adapted to release said draft member, and means operating simultaneously for actuating said trip means and stop member, substantially as described.

13. In an apparatus of the class described, a tender-frame having bearing-wheels, means for coupling said frame movably to the draft-power, a coupling-beam connected to said frame adjacent to its forward side and extending rearwardly thereof, and terminating in a coupling-head, having a tranverse catch member, a draft member carried by the thresher or other machine to be transported and having a recess for engagement with said catch member, a spring-supported stop mounted for movement in said coupling-head and yieldably engaging said draft member, a trip member, a spring-controlled lever operatively connected to said trip member and stop member, and a lever-arm mounted for oscillation upon said frame, and a rod connecting said lever-arm and trip-lever, substantially as described.

14. In an apparatus of the class described, a tender-frame having bearing-wheels, means for coupling said frame movably to the draft-power, a coupling-beam connected to said frame adjacent to its forward side and extending rearwardly thereof and terminating in a coupling-head having upwardly and rearwardly inclined portion and with longitudinal guideways, a frame slidable on said head member and carrying a swinging stop member spring-supported and operative in said coupling-head, and having a trip-bar movable in said guideways, a draft member carried by the thresher or other apparatus to be transported, and having a recess adapted for engagement with said trip-bar and means under the control of the operator for actuating said slidable frame to cause it to move said stop member over said inclined portion to cause said trip member to disengage said draft member, from said catch member, substantially as described.

In testimony that I claim the foregoing as my own I have hereto affixed my signature in the presence of two witnesses.

THOMAS H. PITZER.

Witnesses:
GEO. R. PARKER,
F. S. LEARY.